Patented Nov. 1, 1938

2,135,075

UNITED STATES PATENT OFFICE 2,135,075

LAMINATED GLASS

Willy O. Herrmann, Deisenhofen, Germany, assignor to Chemische Forschungsgesellschaft m. b. H., Munich, Germany, a corporation of Germany No Drawing. Application May 13, 1936, Serial No. 79,618. In Germany November 22, 1934

7 Claims. (Cl. 49—81)

This invention relates to the preparation of laminated glass and more particularly to the use of a special adhesive material in the preparation of laminated glass.

The use of polyvinyl alcohols or their derivatives which are soluble in water or can be swelled by water, has previously been suggested as binding agents in the manufacture of laminated glass. Such adhesive materials used alone do not afford the necessary protection against splintering from a practical standpoint under all conditions of use. In particular, laminated glass prepared employing such adhesive materials tends to fail at low temperatures due to poor adhesion between the glass components and the adhesive material.

An object of the present invention is an adhesive material which, when employed in the manufacture of laminated glass, will afford reliable protection against splintering under varied conditions of use. A further object is a method of making laminated glass which will not fail at low temperatures. These and other objects will be apparent from the following description of my invention.

These objects are accomplished in accordance with the present invention by employing a combination of a polyvinyl alcohol, or a derivative of a polyvinyl alcohol which is soluble in water or can be swelled by water, with a polyhydric compound as the adhesive material in the preparation of laminated glass products. The use of polyhydric compounds in such an adhesive composition greatly increases the tenacity with which the composition adheres to glass.

I have found that a polyvinyl alcohol or a partial derivative of a polyvinyl alcohol which is soluble in water or can be swelled by water, such as a partial ester of polyvinyl alcohol, a partial polyvinyl ether or a partial polyvinyl acetal, may be used in combination with a polyhydric compound as the adhesive material in the manufacture of laminated glass to give a product that affords excellent and reliable protection against splintering. Such a product will not fail even at low temperatures and therefore is a markedly improved product over products previously made employing a polyvinyl alcohol or a polyvinyl alcohol derivative alone as the adhesive material.

By a "partial derivative" of polyvinyl alcohol in the above paragraph, I mean a derivative such as a partial ester which may be formed by the incomplete esterification of a polyvinyl alcohol with an acid, a partial ether which may be formed by the incomplete etherification of a polyvinyl alcohol with an alcohol, or a partial acetal which may be formed by the incomplete condensation of a polyvinyl alcohol with an aldehyde.

The specific effect of the polyhydric compound upon polyvinyl alcohols of various molecular sizes depends probably upon its constitutional relationship with regard to the aggregation of hydroxyl groups, since a wide variety of polyhydric compounds, especially the water-soluble ones, may be effectively employed to increase the tenacity with which polyvinyl alcohol adheres to glass. It has been found, for example, that any of the following polyhydric compounds may be employed, in accordance with the present invention, to improve the adhesive properties of polyvinyl alcohols or their partial derivatives: ethylene glycol, butylene glycol and other glycols, glycerine, glycerine aldehyde, polyhydroxy organic acids, polyhydric phenols, and starch products and their degradation products.

Dextrins and the various sugars have been found to be especially suitable for the present purpose. Aside from markedly increasing the adhesive properties of polyvinyl alcohols, they are cheap, and readily available.

The proportional amounts of a polyvinyl alcohol and a polyhydric compound employed in the adhesive composition may vary within wide limits. The use of but a few per cent of sucrose with a polyvinyl alcohol greatly increases the tenacity with which it adheres to glass. Equal quantities of the two materials or an excess of sucrose may likewise be employed effectively. In general the amount of a polyhydric compound that should be used will depend upon the use for which the adhesive is intended.

The adhesive mixture may be made and applied to glass surfaces by any of the known methods, one of which is illustrated by the following example.

Example 1

Two glass sheets of a thickness of 2.5 mm. were covered with an aqueous solution containing 10% of the higher polymers of polyvinyl alcohol and 4% sucrose. By gradually evaporating the water, clear, bubble-free coatings on the glass sheets were obtained. The glass sheets were then placed one upon the other with the coated surfaces together and were then pressed together with about 4 atmospheres pressure at a temperature of 130° C. There resulted a clear, transparent, laminated glass which afforded excellent protection against splintering even at low temperatures.

An adhesive composition comprising a polyvinyl alcohol, or one of its partial derivatives and a polyhydric compound may likewise be employed, in accordance with the present invention, to cause adhesion between glass sheets and an inter-layer of any of the well-known plastic materials employed in the manufacture of laminated glass.

Example 2

A laminated glass was prepared by interposing a sheet of cellulose acetate between two sheets of glass, said sheets of glass having been previously coated with the adhesive composition comprising polyvinyl alcohol and sucrose described in Example 1. The assembled sheets then were pressed together at elevated temperatures to give a product having reliable non-splintering properties even at low temperatures.

Satisfactory glass products have likewise been prepared by the method of Example 2 employing an intermediate sheet of polyvinyl acetate. Intermediate sheets of other plastic materials may be used successfully.

Other modifications of the present invention will be readily apparent to those skilled in the preparation of laminated glass products. Various mixtures of adhesive materials with a polyvinyl alcohol or its derivatives may be employed in combination with a polyhydric compound. Likewise, mixtures of various polyhydric compounds may be employed to modify the adhesive properties of a polyvinyl alcohol or one of its partial derivatives. These and many other modifications are understood to be within the scope of the present invention.

In the appended claims the term "hydrophyllic polyvinyl compound" has been used to include any of the various polymers of vinyl alcohol and any of the partial derivatives of polyvinyl alcohol, such as the partial esters, partial ethers, and partial acetals, that are water-soluble or can be swelled by water.

I claim:

1. A laminated glass comprising a plurality of glass sheets adhesively joined by means of an intermediate film comprising a hydrophyllic polyvinyl compound and a polyhydric compound selected from the group consisting of sugars, dextrins, starch products and their degradation products, glycols, glycerol, glycerol aldehydes, polyhydroxy organic acids and polyhydric phenols.

2. A laminated glass comprising a plurality of glass sheets adhesively joined by means of an intermediate film comprising a polyvinyl alcohol and a polyhydric compound selected from the group consisting of sugars, dextrins, starch products and their degradation products, glycols, glycerol, glycerol aldehydes, polyhydroxy organic acids and polyhydric phenols.

3. A laminated glass having a layer of a plastic material interposed between sheets of glass and having a film comprising a polyvinyl alcohol and a polyhydric compound selected from the group consisting of sugars, dextrins, starch products and their degradation products, glycols, glycerol, glycerol aldehydes, polyhydroxy organic acids and polyhydric phenols to cause adhesion between the plastic material and the sheets of glass.

4. A laminated glass comprising a plurality of glass sheets adhesively joined by means of an intermediate film comprising a polyvinyl alcohol and a dextrin.

5. A laminated glass comprising a plurality of glass sheets adhesively joined by means of an intermediate film comprising a polyvinyl alcohol and a sugar.

6. A laminated glass comprising a plurality of glass sheets adhesively joined by means of an intermediate film comprising a polyvinyl alcohol and sucrose.

7. A laminated glass comprising a plurality of glass sheets adhesively joined by means of an intermediate film comprising substantially 71% of the higher polymers of polyvinyl alcohol and 29% sucrose.

WILLY O. HERRMANN.